UNITED STATES PATENT OFFICE.

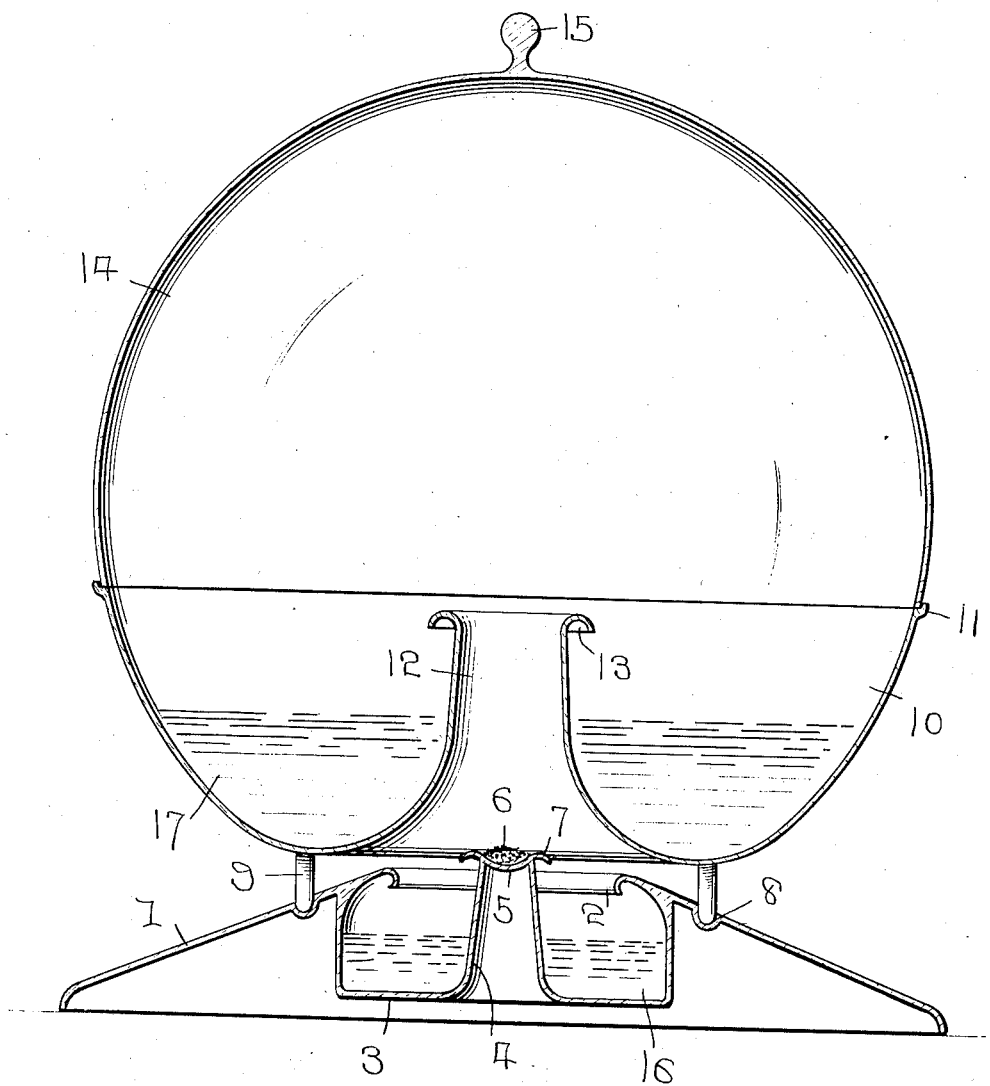

EDWARD MIELKE, OF ROCKLYN, WASHINGTON.

FLY-TRAP.

1,107,091.  Specification of Letters Patent.  Patented Aug. 11, 1914.

Application filed March 23, 1912. Serial No. 685,727.

*To all whom it may concern:*

Be it known that I, EDWARD MIELKE, a citizen of the United States, residing at Rocklyn, in the county of Lincoln and State of Washington, have invented certain new and useful Improvements in Fly-Traps; and I do hereby declare the following to be a full, clear, and exact description of the invention, such as will enable others skilled in the art to which it appertains to make and use the same.

This invention relates to traps and more particularly to that class of devices known as fly traps.

An object is to provide central and upper parts of substantially semi-spherical form to produce a globe and an inclined base adapted to contain a liquid and to support the globe.

A further object is to provide a device of this character having a central support carried by the base for supporting bait to attract the fly, etc., to the interior of the trap.

The objects and advantages of the invention will be hereinafter set forth and more clearly pointed out in the specification and claim.

Referring to the drawing which is a vertical section through the complete trap, 1 represents the inclined base which may be circular or of any other suitable form and is provided with a central opening with the circular edge around the opening turned downwardly and inwardly as shown at 2. A liquid compartment 3 is secured to the under face of the inclined base 1 a short distance from the turned edge 2 and may, if desired be formed integral with the base 1. The central part of the bottom of the liquid compartment 3 is directed upwardly to form the slightly tapering hollow support 4 carrying the concaved bait tray 5 within which suitable bait 6 may be placed. The bait tray 5 preferably has its edge extending beyond the upper end of the hollow support 4 and curved downwardly, as shown at 7, the purpose of which will later appear. The hollow support 4 is preferably of such height as to project through the central opening in the base 1 and thus position the bait tray 5 with the bait 6 therein slightly above the turned edge 2 of the base 1. The base 1 is also provided with the groove 8 in its inclined upper face to receive the supporting legs 9 carried by the central semi-spherical liquid containing member 10 which has a suitable circular flange 11 around its upper edge while its central portion is turned inwardly and upwardly, as shown at 12 and provided with the central opening, the edge of the material around the opening being curved downwardly, as shown at 13, to form a smooth rounded edge around the opening, the portion 12 extending upwardly to within a short distance of the upper circular edge of the member 10. It will be understood that the circular upwardly extended portion 12 of the member 10 is positioned centrally over the hollow member 4 and bait tray 5, thus placing the central opening of the tray 10 directly above the bait tray 5 and bait 6 upon the same. It will be evident that the supporting legs 9 are of such length as to support the member 10 in a position slightly above the upper central portion of the inclined supporting base 1 and that the central opening formed by the upwardly directed portion 12 of the member 10 is about equal in diameter at its lower end to the central opening of the inclined base 1 formed by the downwardly turned circular edge 2 of said base.

Positioned upon the circular upper edge of the semi-spherical member 10 is the circular edge of the semi-spherical upper member 14 which is held in position by means of the circular flange 11, previously mentioned. The upper semi-spherical member 14 is provided with a suitable knob 15 by means of which it may be readily lifted from its position upon the lower semi-spherical member 10 or placed in position thereupon.

This trap may be placed upon a table or in any other place desired. The liquid containing compartment 3 may then be provided with a suitable quantity of liquid 16 such as soapy water and bait of either a solid or liquid character placed in the bait tray 5 to attract flies, etc. The second or central semi-spherical member 10 may then be placed in position with the supporting legs 9 resting in the groove 8 in the base 1 and the upper semi-spherical member 14 positioned upon the member 10, it being understood that a suitable liquid 17 is also placed in the member 10. The fly will be attracted by the bait 6 and will ascend the inclined supporting base 1 until it reaches the turned circular edge 2, from whence it will be compelled to fly to the bait 6 within the bait tray 5, either lighting upon the bait or upon the turned edge 7 of the tray 5. As the fly is inclined to fly upwardly it will, upon leaving the bait 6 fly through the upwardly directed portion 12 of the semi-spherical member 10 and into the globe formed by the semi-spherical members 10 and 14. Upon becoming exhausted from flying around within the globe, the fly will drop into the liquid 17 and there be drowned. Should the fly, however, find its way back through the central opening of the semi-spherical member 10 it will drop into the liquid 16. As the fly cannot escape from the trap, it will be evident that it will fall either into the liquid 16 or the liquid 17.

As this trap may be made wholly of glass or other cheap material, preferably of a transparent character it will be evident that the same may be manufactured at an extremely small cost, will be highly efficient in use and may be readily cleansed.

What I claim is:

The improved fly trap herein described, the same consisting of a base having upwardly inclined upper face with central opening with inwardly and downwardly turned edge, a liquid containing receptacle depending from the upper portion of said base and having upwardly directed hollow support, a bait tray mounted upon said support, a central substantially semi-spherical liquid containing member mounted upon said base and having a central upwardly extending hollow member with its upper edge curved downwardly, the lower edge of the said semi-spherical member terminating in close proximity to the upper face of said base, and a cover to said semi-spherical member.

In testimony whereof I have signed my name to this specification in the presence of two subscribing witnesses.

EDWARD MIELKE.

Witnesses:
HERMAN R. MAURER,
EMEL KRUGER.